May 6, 1924. 1,492,800
A. G. JAEGER
ELECTRIC WELDING APPARATUS
Filed Nov. 20, 1922
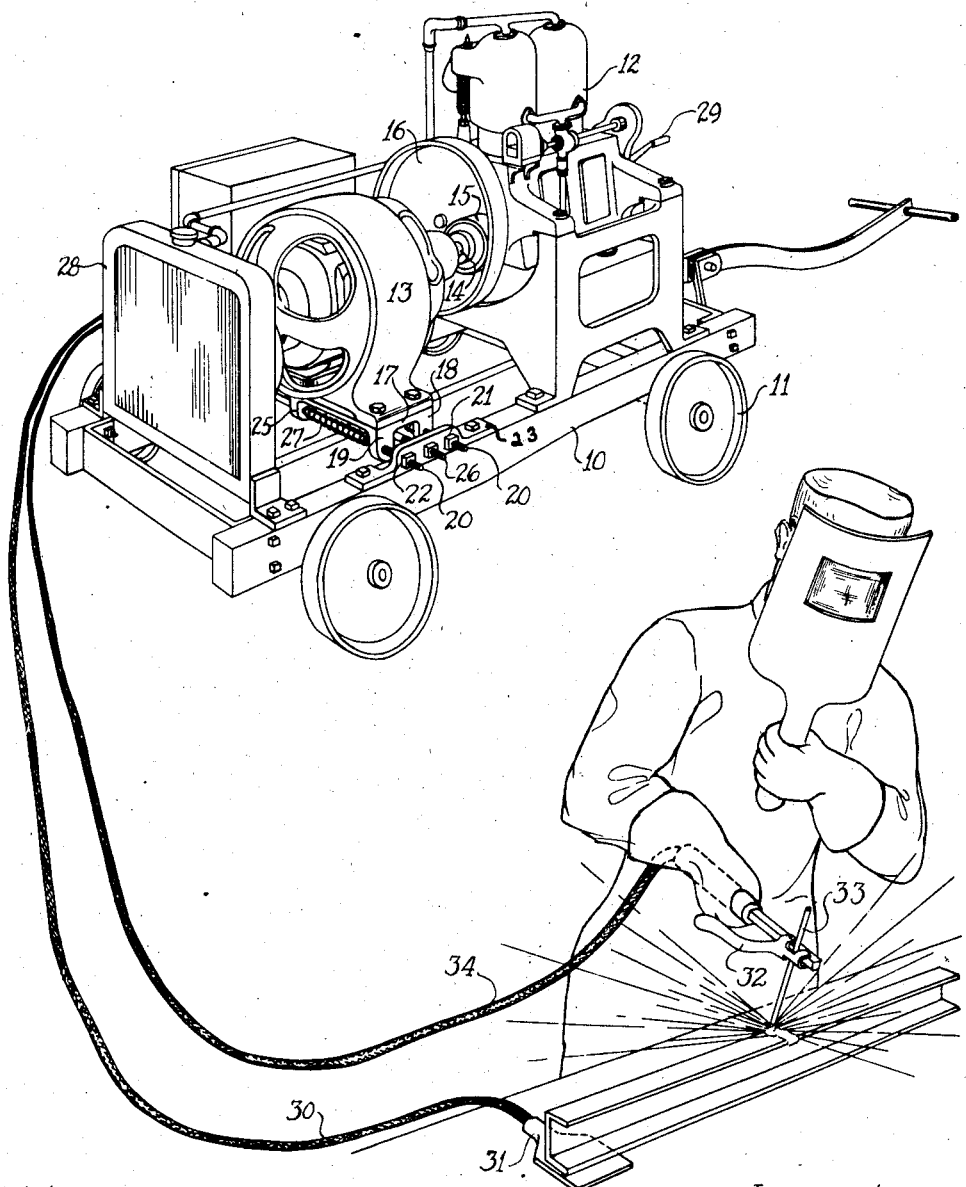

Patented May 6, 1924.

1,492,800

UNITED STATES PATENT OFFICE.

ARNOLD G. JAEGER, OF DUBUQUE, IOWA.

ELECTRIC WELDING APPARATUS.

Application filed November 20, 1922. Serial No. 601,989.

*To all whom it may concern:*

Be it known that I, ARNOLD G. JAEGER, a citizen of the United States of America, residing at Dubuque, in the county of Dubuque and State of Iowa, have invented certain new and useful Improvements in Electric Welding Apparatus, of which the following is a specification.

My invention relates to gasoline engine driven electric arc welding and cutting plants and more particularly to a portable welding outfit.

The object of my invention is in the provision of a portable arc welding and cutting plant, capable, due to the particular formation thereof, of the same working capacity as outfits of much greater weight.

Another object of my invention is in the provision of a particular means in connection with an internal combustion engine and the generating dynamo in an arc welding and cutting plant, whereby the continuous intermittent heavy load, which is put upon the generating dynamo, will be absorbed before it can be transmitted to the internal combustion engine.

A still further object of my invention is in the provision of an arc welding and cutting outfit adapted to absorb the intermittent heavy loads upon the generating dynamo, with the result that there is practically no jar attending the operation thereof, which permits the building of an outfit so light in weight that it is easily portable and capable of the same capacity as other outfits of much greater size and weight.

Other objects of my invention will appear in the following specification in connection with the annexed drawings in which:

The figure, is a perspective view of my portable arc welding and cutting plant.

In the drawings, I have shown a base portion 10, adapted to be placed upon a truck 11, for portability. At 12, is shown an internal combustion engine and at 13, a starting generating dynamo for supplying the current for welding and cutting. The starting generating dynamo is mounted in a tensioned manner upon the base 10, by means of an assembly to be described later. The object of this tensioned mounting is to provide a yielding contact between said generating dynamo and internal combustion engine, which is provided in the following manner: An extension 14, of the shaft of the generating dynamo has mounted upon its outer end a friction wheel 15. This wheel 15, is adapted to engage the inner periphery of the fly wheel 16 of the internal combustion engine. The means for maintaining a yielding contact between said hub and the engine fly wheel is provided in the tensioned mounting of the generating dynamo base. A plate 17, has positive connection with the lower portion of the generating dynamo and said plate has slidable connection through the bearings 18 and 19, with the two parallel bars 20, supported in bearings 21 and 22, in the end plate 23. A transverse bearing 25, also slidably engages the parallel bars at an intermediate point and is connected with the end plate by means of an adjustable bolt member 26. Coiled springs 27, abutting the transverse plate 25, at one end and the bearings 18 and 19 of the plate 17, at the other, provide means for yieldably positioning the generating dynamo in such manner that the hub or pulley 15, is always maintained in a tensioned manner against the inner periphery of the fly wheel of the engine.

A radiator 28, having the formal connections with the internal combustion engine provides means for cooling the device.

A starting crank 29, is shown on the internal combustion engine and provides the usual means for starting the outfit.

In the drawings, I have shown an operator in the course of a practicable operation, wherein there is illustrated one of the usual assemblies in electric arc welding and cutting. At 30, is shown the ground wire in connection with the ground plate 31, upon which the work is placed. The operator is shown grasping the welding tool 32, in which the welding metal 33, is firmly but releasably held. The connection 34, supplies the welding current from the generating dynamo.

For arc welding the operation of the device is as follows:

The starting of the internal combustion engine and its continuous operation, simultaneously operates the starting generating dynamo, which provides the current for welding. This welding current is transferred to the welding tool through the connection 34. In the welding operation, the operator melts the welding metal upon the work at the point where the contact is made, the plate being a ground member, completes the circuit. In the practical operation, the welding metal is used up rather quickly and a new rod of metal replaced in the welding tool. Due to the fact that the work is placed upon a block which is grounded, when the operator brings the welding tool, or rather, welding metal to a point near the work, the so-called arc will be made, in other words, the contact is completed in the electrical circuit and at this time there is sufficient heat generated to melt the welding metal in order that it may be used as desired.

When the arc is made, or rather, the completion of the electrical circuit, there is a tremendous load placed on the generating dynamo which, up to this time, has been running idle. The load on the generating dynamo is transmitted directly to the internal combustion engine and in the conventional arc welding plants is attended with a noticeable jar and strain thereon, until the engine gradually overcomes the load. In view of the fact that the operator is continually using up the welding material and replacing it, there is a continually intermittent and severe load upon the generator, with the resulting strain and jar upon the engine.

For cutting, the operation of the device is much the same as that of welding with the exception that a carbon or graphite electrode is placed in the tool in place of welding rod. Instead then of depositing metal as in welding, the arc formed cuts the metal. During this operation there is a continual fluctuation of amperage or load caused by the various distances the operator holds the carbon from the work. This fluctuation of amperage amounts to from 10 to 100 amperes and in order to maintain a stabilized and steady arc these sudden and very frequent shocks must be provided for.

It is essential in electric welding that the operator maintain a steady and stabilized arc to procure the proper fusion of the metals. The arc must be struck on the instant and maintained at proper amperage throughout the operation. My frictional engagement then acts as a sort of cushion and helps materially in stabilizing the arc.

During a welding operation, especially when the operator is an apprentice, the welding rod sometimes freezes to the work. In this event the load or amperage on the generator jumps from his welding amperage whether it be 50-75 or 100 amperes to 225 amperes, the capacity of the generator. This shock comes on the instant and is usually attended with breakage either in the engine, generator or transmission.

However, it is to overcome this severe strain upon the engine and plant that the applicant has provided a yielding frictional contact between the engine and generating dynamo, with the result that, when the load is placed upon the generating dynamo, there will be sufficient temporary slippage between the elements 15 and 16, that the jar and strain upon the engine will be reduced practically to a minimum.

To realize the results which applicant attains in minimizing the strain upon his plant, it may be said that he is enabled to produce a machine of substantially one-half the weight and still have an equal working capacity.

The arc welding and cutting art discloses direct gear connections between the engine and generating dynamo, also chain and belt. In the case of outfits equipped with gear connections, the machines are of great weight and with very large gear wheels to prevent breakage, due to the intermittent jar attending the making of the arc and resultant load upon the generating dynamo which is transmitted directly to the engine. Even in these exceedingly heavy plants, the jar on the engine and consequent strain is readily noticed when the load is placed on the generating dynamo.

Likewise in the welding plants equipped with chain and belt, the constant intermittent jar gradually wears them down until they break and are replaced.

It is realized that in a belt construction there is a slight slippage, but this slippage only lasts until the belt really takes hold, whereupon the jar is transmitted to the engine and a severe strain is placed on the belt. Again in belted drive construction it has been found that the belt invariably flies off when a sudden load is placed thereon.

As a portable unit which is in use in all kinds of weather, the belt has been found very unsatisfactory on account of the effect of damp or rainy weather which causes the belt to stretch.

The friction members on my drive construction are not effected by climatic conditions.

In a belt construction, the jar is not gradually compensated for as in my present structure, where the engine is permitted to pick up the load instantly and maintain it. As a matter of fact, the present structure was devised to do away with the constant necessary replacement of belts and chains, and at the same time to overcome the constant jar and strain upon the engine.

What I claim is:

1. Electric arc welding and cutting apparatus, comprising a prime mover, a generating dynamo for supplying the current for welding and means for relieving the apparatus of suddenly applied electrical load comprising a friction drive connection between said prime mover and dynamo.

2. Electric arc welding and cutting apparatus, comprising an internal combustion engine, a generating dynamo for supplying the current for welding, and means for relieving the apparatus of suddenly applied electrical load comprising a friction drive connection between said engine and dynamo, including a pulley mounted in the dynamo shaft, a fly-wheel mounted on the engine shaft, and yielding means for maintaining said pulley in frictional engagement with said fly-wheel.

3. Electric arc welding and cutting apparatus, comprising an internal combustion engine, a generating dynamo for supplying the current for welding, and means for relieving the apparatus of suddenly applied electrical load comprising a friction drive connection between said engine and dynamo, including a rigid member rotated by said engine and yielding means for maintaining direct frictional engagement between said members.

In testimony whereof I affix my signature.

ARNOLD G. JAEGER.